(12) United States Patent
Huang (10) Patent No.: US 10,604,123 B2
(45) Date of Patent: Mar. 31, 2020

(54) MOTORCYCLE LIFTING TOOL (71) Applicant: POUL CHANG METAL INDUSTRY CO., LTD., Taichung (TW)

(72) Inventor: Chia-Hao Huang, Taichung (TW)

(73) Assignee: POUL CHANG METAL INDUSTRY CO., LTD., Taichung (TW)

( * ) Notice: Subject to any disclaimer, the term of this patent is extended or adjusted under 35 U.S.C. 154(b) by 216 days.

(21) Appl. No.: 15/956,980

(22) Filed: Apr. 19, 2018

(65) Prior Publication Data

US 2019/0322248 A1 Oct. 24, 2019

(51) Int. Cl.
B60S 9/04 (2006.01)
B62H 3/00 (2006.01)

(52) U.S. Cl.
CPC . B60S 9/04 (2013.01); B62H 3/00 (2013.01)

(58) Field of Classification Search
CPC ...... B66F 2700/12; B66F 13/00; B66F 15/00; B66F 19/00; B66F 3/00; B66F 3/005; B66F 7/26; B66F 7/28
See application file for complete search history.

(56) References Cited

U.S. PATENT DOCUMENTS

| 1,558,854 | A | * | 10/1925 | Falconer | G05G 5/06 254/123 |
| 4,494,764 | A | * | 1/1985 | Kelley | B62H 1/00 280/293 |
| 6,494,423 | B1 | * | 12/2002 | Ruth | A47B 91/02 248/188.8 |
| 7,188,854 | B1 | * | 3/2007 | Pickens | B62H 1/02 254/131 |
| 7,311,294 | B1 | * | 12/2007 | Ruan | B60P 7/15 254/100 |
| 8,424,895 | B1 | * | 4/2013 | Stokes | B62H 3/10 280/293 |
| 2004/0033117 | A1 | * | 2/2004 | Brown | B60P 7/15 410/151 |
| 2006/0051179 | A1 | * | 3/2006 | Scott | B61D 45/001 410/151 |
| 2012/0267587 | A1 | * | 10/2012 | Hunt | B62H 1/02 254/131 |
| 2015/0307147 | A1 | | 10/2015 | Andrews | |

* cited by examiner

Primary Examiner — Tyrone V Hall, Jr.
(74) Attorney, Agent, or Firm — WPAT, PC (57) ABSTRACT A motorcycle lifting tool includes a main body, a support member, a hold seat, a fixing member, and an adjustment support device. The main body has a first end and a second end foldable against each other. The second end stands on the ground. The support member is linearly disposed at the first end and has a screw end and a support end, wherein the screw end is exposed at the outer side of the first end. The hold seat is screwed to the screw end for holding the rear wheel of the motorcycle. The fixing member removably fixes the support member to the main body. The adjustment support device is disposed between the main body and the support member for supporting the support end. When the fixing member is removed, the adjustment support device drives the support member to move outward from the main body.

9 Claims, 8 Drawing Sheets

MOTORCYCLE LIFTING TOOL

BACKGROUND OF THE INVENTION

1. Field of the Invention

The present invention relates to tools, and more particularly, to a motorcycle lifting tool.

2. Description of the Related Art

Disclosure of the patent with the publication number of US 2015/0307147 discloses a motorcycle jack, comprising a base arm and lift arm that are hinged and foldable with each other. The base arm includes a foot which is parallel to the ground during operation. The lift arm is hinged with the base arm, and provided with a seat portion for holding the motorcycle. The base arm includes a plurality of bores disposed in a linear and incline arrangement against the base arm, facilitating the length adjustment of the motorcycle jack.

However, the length of such motorcycle jack is only able to be adjusted according to the fixed distance between two bores. If the length is to be adjusted for a length which is less than the fixed distance between the bores, such adjustment is not executable. Thus, the usage of the motorcycle jack is structurally limited, failing to meet the practical user demand.

SUMMARY OF THE INVENTION

For improving the issues above, the present invention discloses a motorcycle lifting tool, comprising a main body, with a support member and holding seat disposed at the main body, wherein the holding seat holds the rear wheel of the motorcycle and is screwedly rotatable against the support member for adjusting the axial length between the holding seat and the support member, such that the lifting tool is applied for lifting the rear wheel of the motorcycle.

For achieving the aforementioned objectives, a motorcycle lifting tool is provided, comprising:

a main body provided with a first end and a second end that are foldable and expandable against each other, the second end allowed to stand on a ground;

a support member slidably disposed at the first end of the main body and arranged in linear alignment to the first end, the support member including a screw end and a support end, the screw end exposed at an outer side of the first end, the support end disposed in the main body;

a holding seat screwed to the screw end for supporting a rear wheel of the motorcycle;

a fixing member removably fixing the support member to the main body; and an adjustment support device connected between the main body and the support member for supporting the support end of the support member; when the fixing member is removed from the main body, the adjustment support device is allowed to drive the support member to be projected from the main body.

With such configuration, the axial length between the support member and the holding seat is allowed to be rotatably adjusted in advance, so as to facilitate the rear wheel lifting operation. Further, when the fixing member is removed, the adjustment support device is able to be shifted to sway for pushing the support member outward, so as to compensate or increase the axial length of the holding seat compared against the main body. Therefore, the rear wheel of the motorcycle is able to be lifted to a predetermined height for facilitating the motorcycle maintenance.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 8, the motorcycle lifting tool 100 in accordance with an embodiment of the present invention comprises a main body 10, a support member 20, a holding seat 30, a fixing member 40, and an adjustment support device 50. The holding seat 30 is installed at an end of the support member 20 for supporting the rear wheel 1 of the motorcycle. The fixing member 40 and the adjustment support device 50 are disposed at the main body 10 for controlling if the support member 20 moves along a linear direction against the main body 10, so as to adjust the length of the main body 10 for lifting the motorcycle against the ground, facilitating the motorcycle maintenance operation.

The main body 10 comprises a first end 10a and a second end 10b that are allowed to be folded or expanded against each other, and the second end 10b is allowed to stand on the ground. In an embodiment of the present invention, the main body 10 includes a first arm 11 and a second arm 12 that are pivotally connected and foldable against each other. The first arm 11 and the second arm 12 are formed in a U-shaped elongated shell. The second end 10b is disposed at the second arm 12, and the second end 10b is provided with an L-shaped support plate 13 fixed at the second end 10b for standing on the ground. The first end 10a of the main body 10 is disposed at the first arm 11 away from the second end 10b. The support plate 13 has the bottom face thereof being a non-smooth face to achieve a sliding resisting function.

Figure 3:
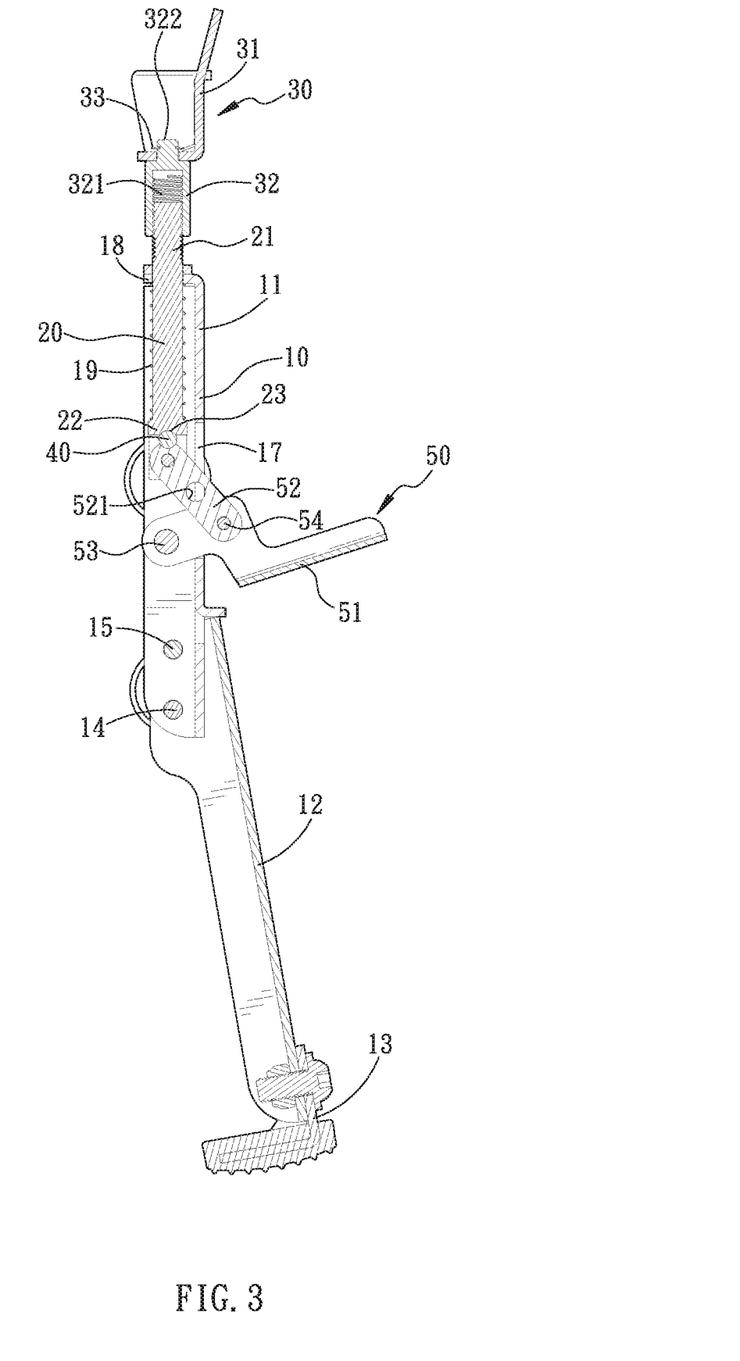
FIG. 3 is a sectional view of the motorcycle lifting tool in accordance with an embodiment of the present invention.
Figure 4:
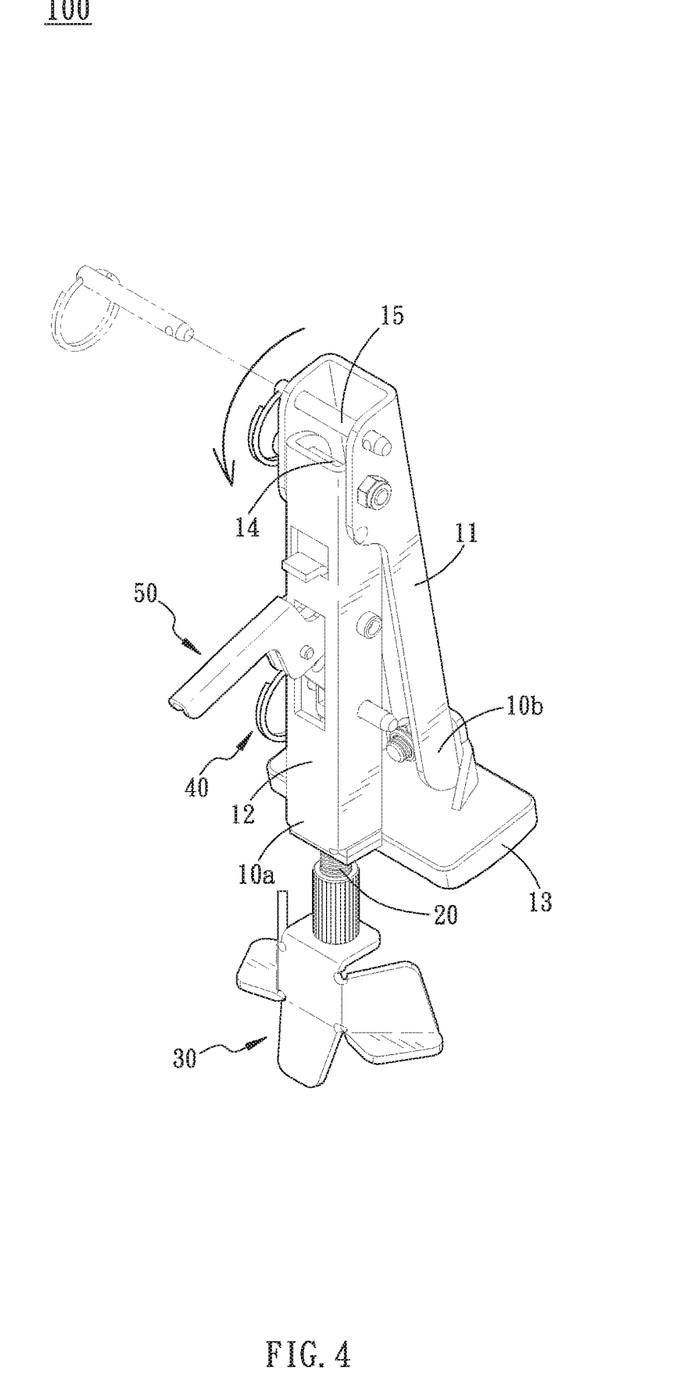
FIG. 4 is a schematic view illustrating the main body of the motorcycle lifting tool being folded.

The present invention further comprises a rotation axle 14 and a pin 15. The rotation axle 14 is pivotally connected between the first arm 11 and the second arm 12, with the pin 15 removably passing through the first arm 11 and the second arm 12. When the pin 15 is removed, the first arm 11 and the second arm 12 are allowed to be pivotally folded against each other with the rotation axle 14 as the pivot center, as shown by FIG. 4, so as to provide the portability and storability of the present invention. As shown by FIG. 3, when the first arm 11 and the second arm 12 are at the expanding position, the axis of the first arm 11 and the axis of the second arm 12 are not disposed in an axial alignment. In other words, the first arm 11 slightly slants against the second arm 12.

The support member 20 is formed in a rod shape, and slidably disposed at the first end 10a of the main body 10 to be arranged in linear alignment to the first end 10a. In an embodiment of the present invention, the support member 20 passes through the first arm 11, and the support member 20 includes a screw end 21 exposed at the outer side of the first end 10a and a support end 22 disposed in the first arm 11 of the main body 10.

Figure 5:
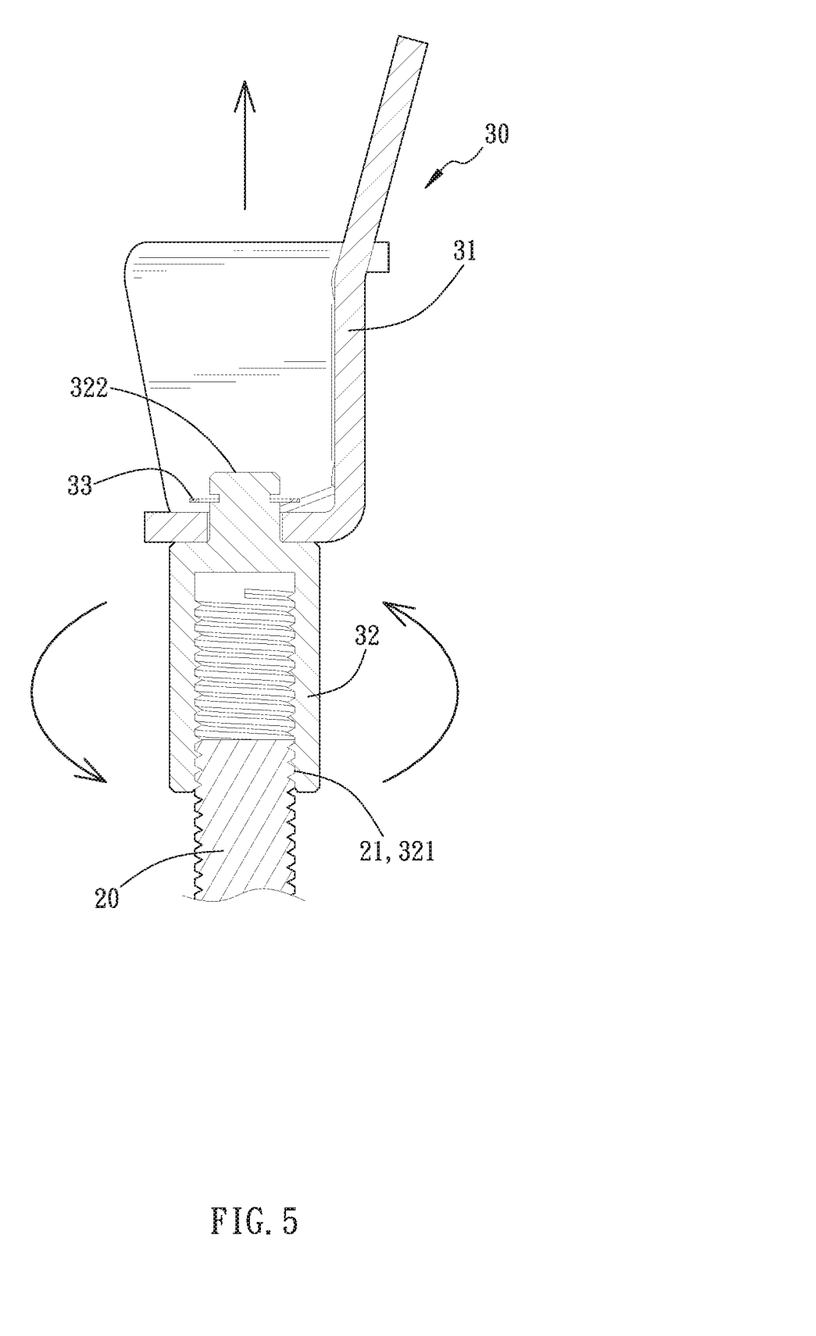
FIG. 5 is a schematic view illustrating the support member and the holding seat screwed with each other.

The holding seat 30 comprises a holding portion 31 and a pipe portion 32 connected with the holding portion 31. The holding portion 31 holds the rear wheel 1 of the motorcycle. The pipe portion 32 has an inner thread 321 which is screwedly combined with the screw end 21 of the support member 20. By use of the screw combination, the axial length formed of the holding seat 30 and the support member 20 is adjusted. The outer wall of the pipe portion 32 is provided with a concave-convex structure for allowing the user to drive the holding seat 30. In an embodiment of the present invention, the holding portion 31 and the pipe portion 32 are two separate components. The pipe portion 32 includes a projection 322 passing through the bottom portion of the holding portion 31 and being clamped by a C-clamp 33, such that the pipe portion 32 is combined to the holding portion 31. As shown by FIG. 5, with the pipe portion 32 of the holding seat 30 screwedly combined with the support member 20, the axial length of the support member 20 included in the holding seat 30 is allowed to be adjusted. Therefore, the total axial length formed of the length of the holding seat 30 and the length of the support member 20 is adjusted, so as to meet the height lift demand of the motorcycle.

Further, the first arm 11 of the main body 10 is transversely provided with a first fixing bore 16 and an opening 17, and the support end 22 of the support member 20 is provided with a second fixing bore 23.

The fixing member 40 includes an insertion portion 41 and a ring-pull 42. The insertion 41 has an end thereof provided with a positioning ball 43 which is allowed to project from or be pressed into the insertion portion 41. With the insertion portion 41 removably passing through the first fixing bore 16 and the second fixing bore 23, and with the engagement function provided by the positioning ball 43, the fixing member 40 is able to fix the support member 20 to the main body 10, so as to prevent the support member 20 from sliding against the first arm 11. The fixing member 40 in accordance with the present invention is an element substantially identical to the pin 15. However, the fixing member 40 is not limited to the certain embodiment hereof.

The adjustment support device 50 is connected between the main body 10 and the support member 20 for supporting the support end 22 of the support member 20. When the fixing member 40 is removed for separating the main body 10 and the support member 20, the adjustment support device 50 allows the linear movement of the support member 20 against the main body 10, so as to adjust the length of the support member 20 out of the main body 10. In an embodiment of the present invention, the adjustment support device 50 includes an operation handle 51 and a linkage 52. The operation handle 51 is formed in an N shape, with one end thereof pivotally connected in the first arm 11 of the main body 10 through a fixing axle 53, and the other end exposed at the outer side of the first arm 11 through the opening 17. The linkage 52 has one end thereof connected with the support end 22 of the support member 20, and the other end thereof pivotally connected between two ends of the operation handle 51 through a pivot axle 54. When the fixing member 40 is removed from the main body 10, the user is allowed to shift the operation handle 51 toward the first arm 11, so as to use the linkage 52 to drive the support member 20 to slide along a linear movement against the first arm 11, thereby pushing the support member 20 outward for extending the length of the support member 20 projecting from the first arm 11 of the main body 10. The length between the pivot axle 54 and the fixing axle 53 is smaller than the length between the pivot axle 54 and the free end of the operation handle 51. In an embodiment of the present invention, the free end of the operation handle 51 is the end exposed at the main body 10. Therefore, the force demand imposed from the operation handle 51 upon the support member 20 through the linkage 52 is reduced.

Figure 2:
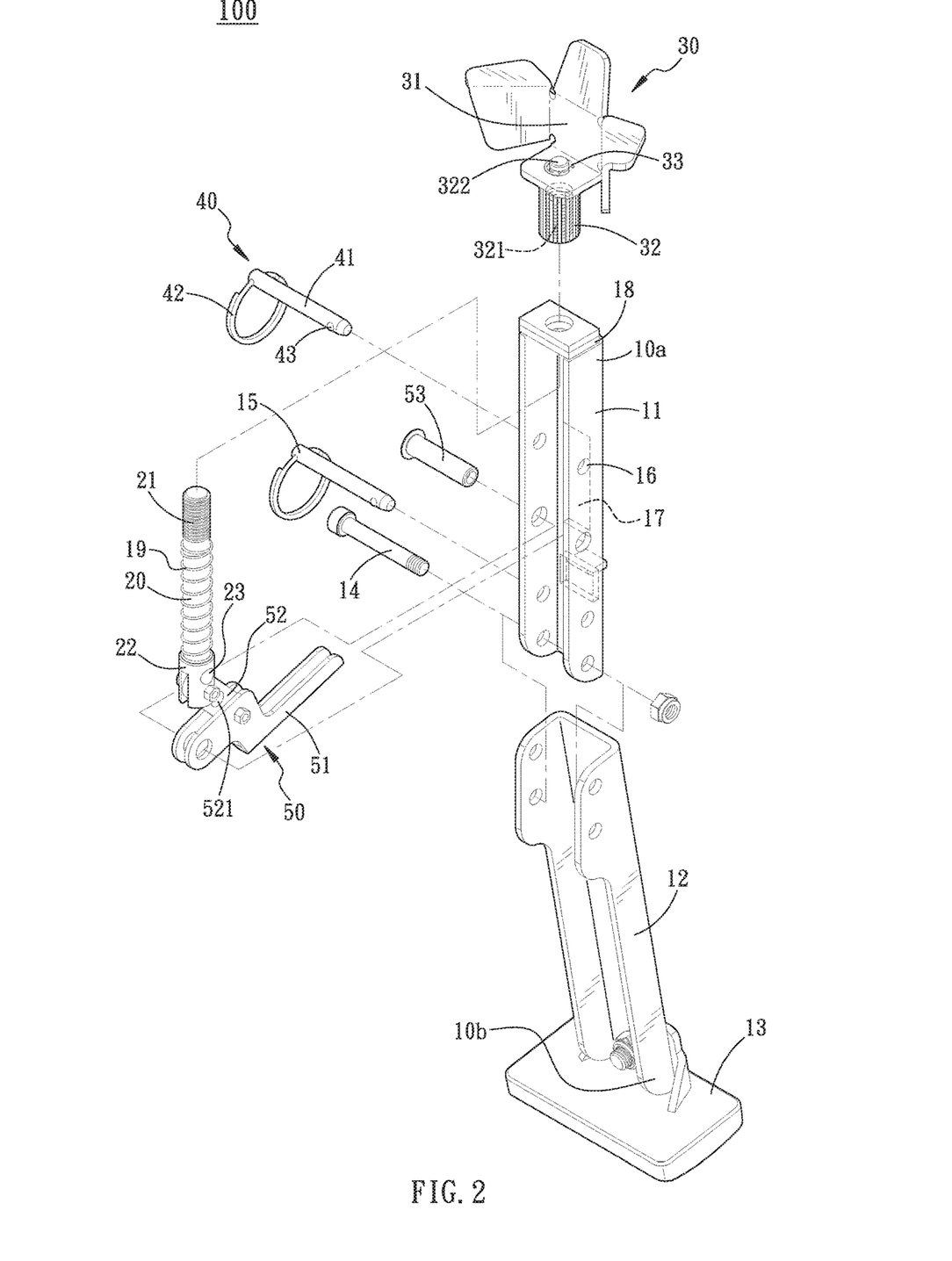
FIG. 2 is an exploded view of the motorcycle lifting tool in accordance with an embodiment of the present invention.
Figure 6:
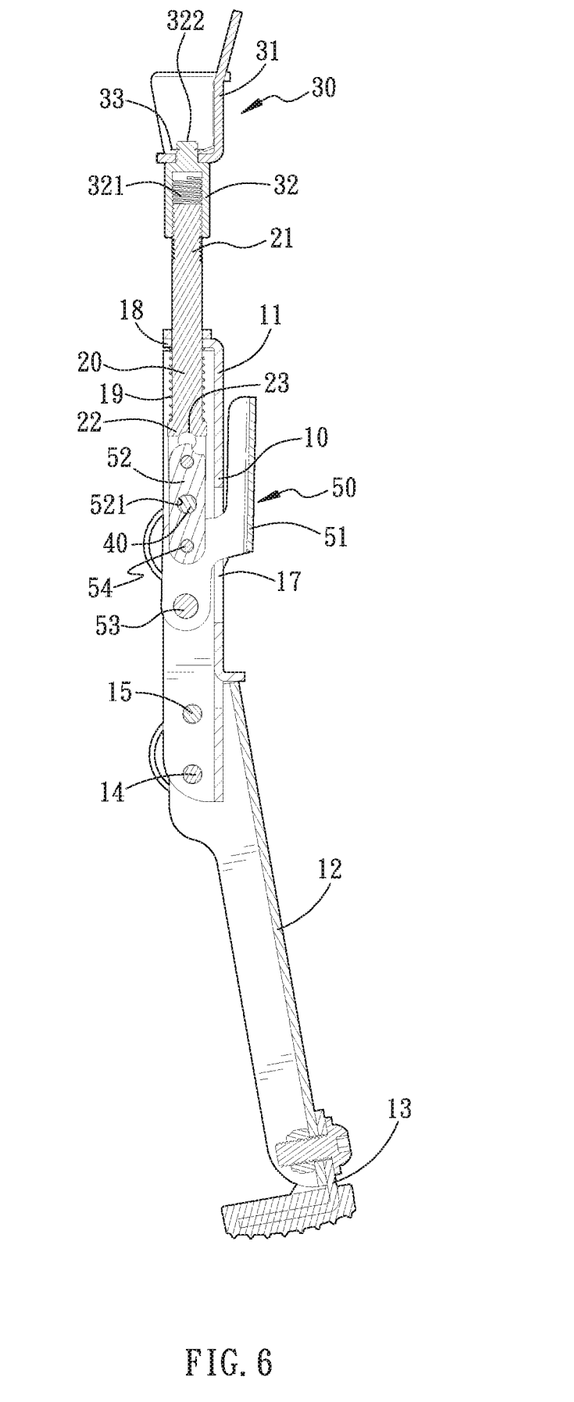
FIG. 6 is a schematic view of the operation handle of the adjustment support device being shifted toward the first arm, illustrating the support member being pushed outward from the main body.

Furthermore, as shown by FIG. 2 and FIG. 6, the linkage 52 includes a positioning bore 521. When the linkage 52 triggers the support member 20 to slide, by aligning the positioning bore 521 and the first fixing bore 16 with the fixing member 40 passing therethrough, the length of the support member 20 projecting from the first arm 11 of the main body 10 extends.

Moreover, a position limiting plate 18 is disposed at the first end 10a of the first arm 11 of the main body 10, with the support member 20 passing through the position limiting plate 18. Also, a resilient member 19 is disposed between the position limiting plate 18 and the support member 20, thereby permanently pushing the support member 20 toward the adjustment support device 50.

Figure 1:
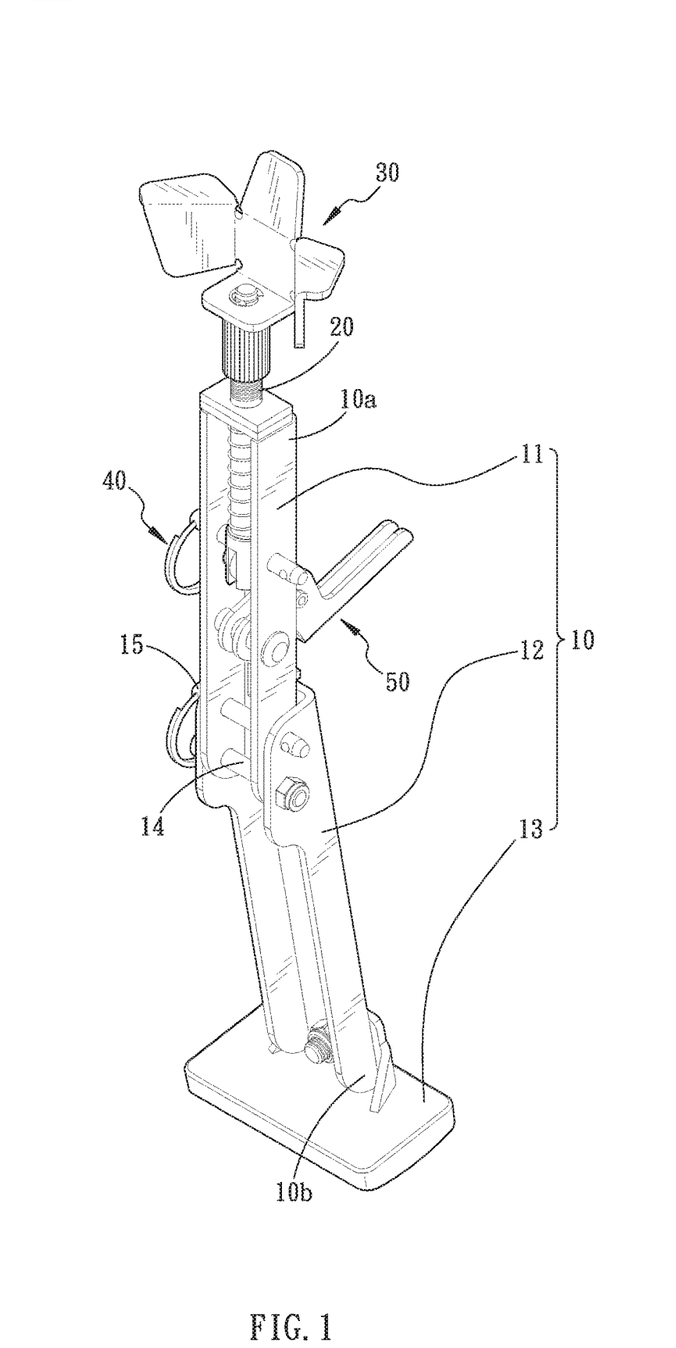
FIG. 1 is a perspective view of the motorcycle lifting tool in accordance with an embodiment of the present invention.
Figure 7:
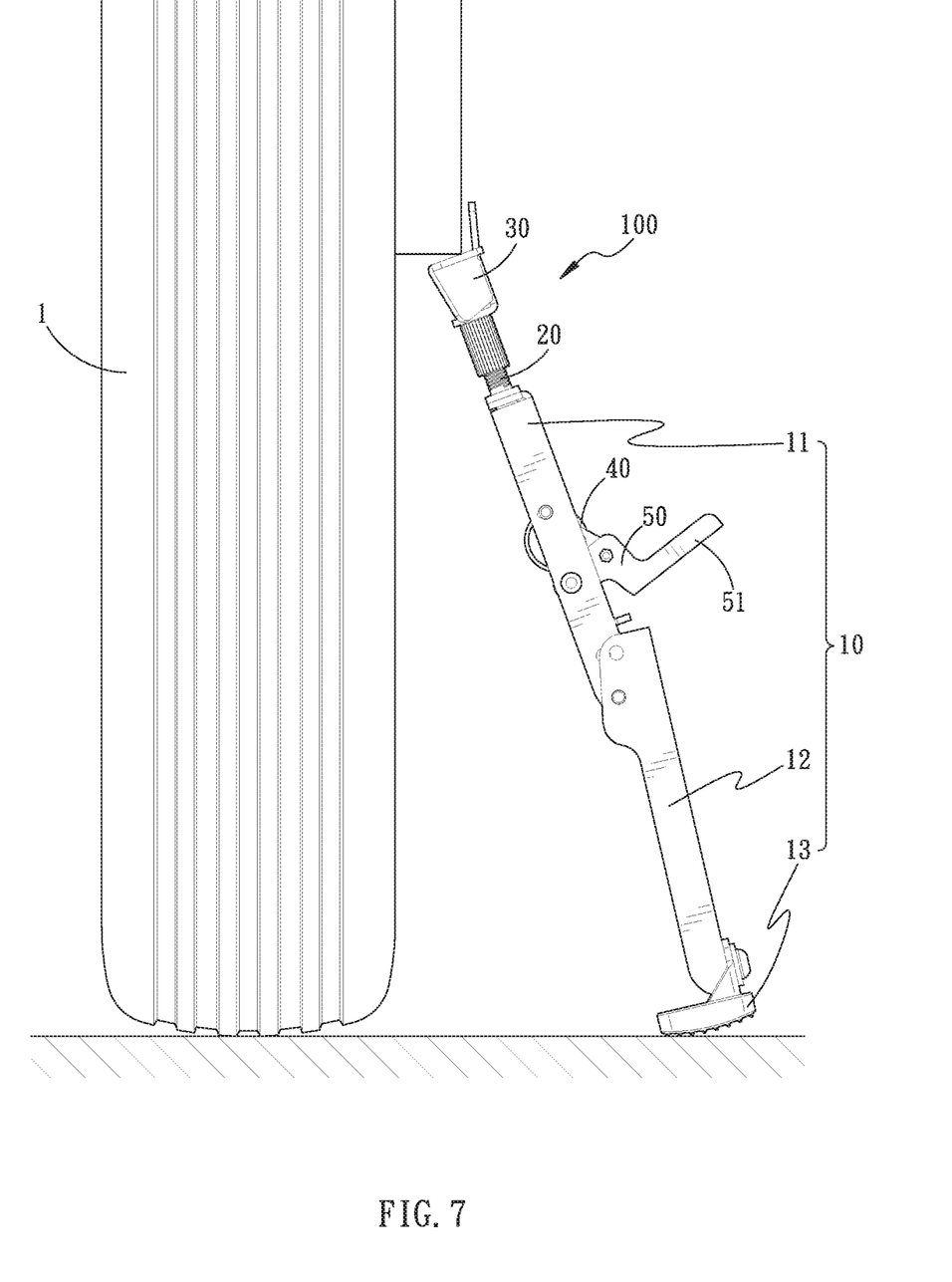
FIG. 7 is a schematic view of the operation status illustrating the rear wheel of the motorcycle not being lifted.
Figure 8:
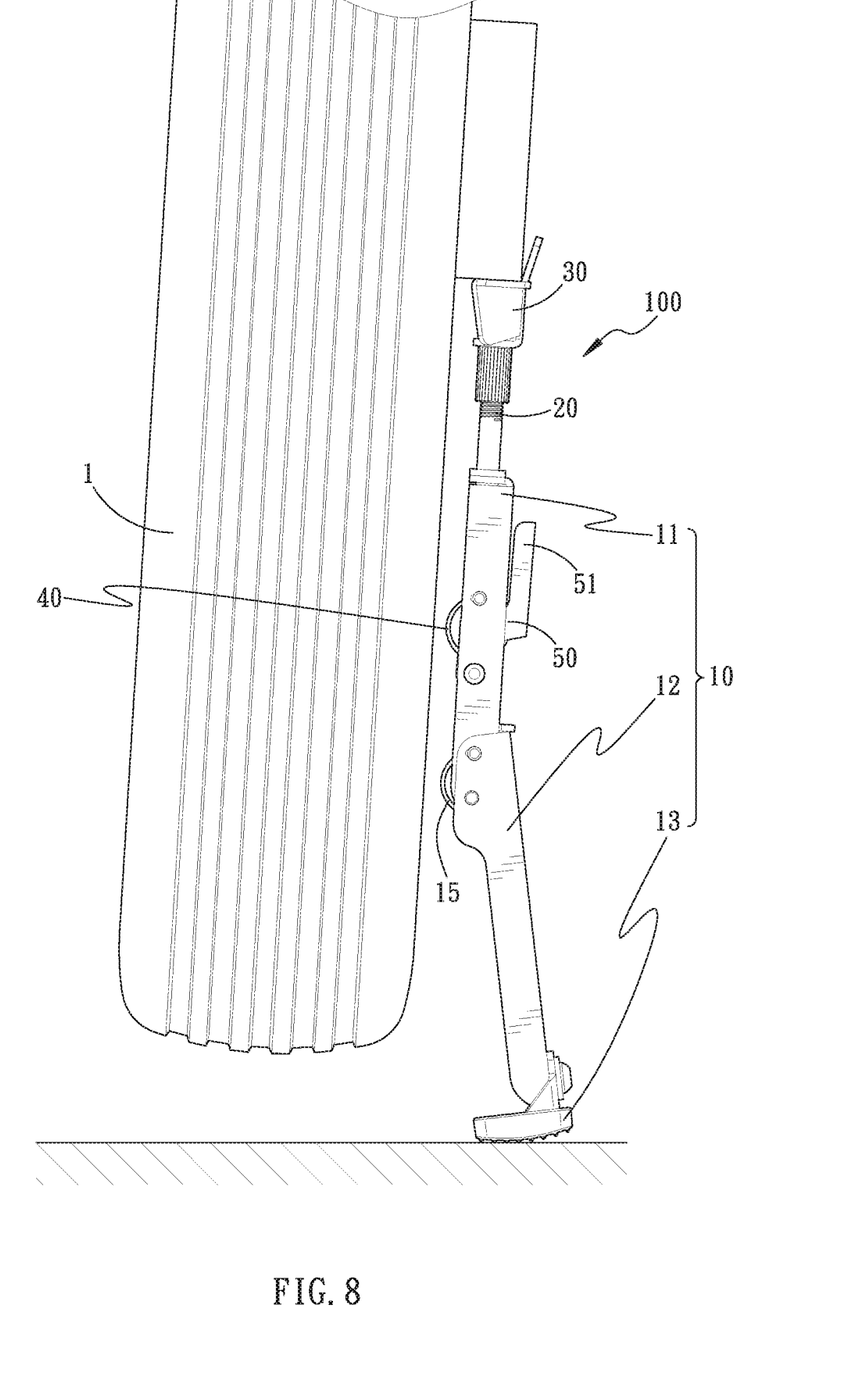
FIG. 8 is a schematic view of the operation status illustrating the rear wheel of the motorcycle being lifted.

Referring to FIG. 1, FIG. 7, and FIG. 8, during the operation status of the present invention, the first arm 11 and the second arm 12 of the main body 10 of the motorcycle lifting tool 100 are opened but not fully expanded (the pin 15 in not inserted through the first arm 11 and the second arm 12). Also, the support plate 13 is approximately disposed in parallel to the ground and rests on the ground. The holding seat 30 contacts the axle portion of the rear wheel 1 of the motorcycle. Next, the user is allowed to push or kick the second arm 12 for forcing the second arm 12 to move toward the motorcycle, such that the first arm 11 sways outward for lifting the rear wheel 1 of the motorcycle, and the rear wheel 1 is lifted, as shown by FIG. 8. When the rear wheel 1 is lifted, the pin 15 is inserted through the first arm 11 and the second arm 12, so as to fix the first arm 11 and the second arm 12 at the expanding position.

When the length of the main body 10 is not sufficient for lifting the motorcycle (when the total length of the holding seat 30 and the support member 20 shown in FIG. 5 is insufficient), the fixing member 40 is able to be removed from the first arm 11 of the main body 10, and a force is imposed upon the operation handle 51 of the adjustment support device 50 for shifting the operation handle 51 to sway toward the first arm 11, such that the support member 20 is pushed outward for a distance from the first arm 11 for further lifting the rear wheel 1. Noticeably, the adjustment support device 50 is applied as a force saving mechanism for facilitating the operation, so as to easily raise the holding seat 30 for lifting the rear wheel 1.

With such configuration, the support member 20 and the holding seat 30 are able to be rotated against each other for adjusting the total length thereof in advance, so as to facilitate the lifting operation of the rear wheel 1 of the motorcycle. Also, when the length of the main body 10 is insufficient for lifting the rear wheel 1 to the target height, the adjustment support device 50, with the fixing member 40 is removed therefrom, is shifted to push the support member 20 outward for increasing the axial length of the holding seat 30 extending from the main body 10. Therefore, the rear wheel 1 is allowed to be lifted to the target height for the maintenance of the motorcycle.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motorcycle lifting tool, comprising:
    a main body provided with a first arm and a second arm that are pivotally connected and foldable against each other, with a second end disposed at the second arm, and a first end disposed at the first arm and away from the second end, such that the first end and the second end are foldable and expandable against each other, and the second end is allowed to stand on a ground surface;
    a support member slidably disposed at the first end of the main body and arranged in linear alignment to the first end, the support member including a screw end and a support end, the screw end exposed at an outer side of the first end, the support end disposed in the main body;
    a holding seat screwed to the screw end for supporting a rear wheel of the motorcycle;
    a fixing member removably fixing the support member to the main body; and
    an adjustment support device connected between the main body and the support member for supporting the support end of the support member; when the fixing member is removed from the main body, the adjustment support device is allowed to drive the support member to be projected from the main body.

2. The motorcycle lifting tool of claim 1, wherein the main body includes a first fixing bore, and the support end includes a second fixing bore, such that the fixing member passes through the first fixing bore and the second fixing bore for fixing the support member to the main body.

3. The motorcycle lifting tool of claim 2, wherein the adjustment support device includes an operation handle and a linkage; the operation handle has one end thereof pivotally connected with the main body, and the another end thereof exposed at the main body, the linkage has one end thereof connected with the support end, and the other end thereof connected with the operation handle.

4. The motorcycle lifting tool of claim 3, wherein the linkage is pivotally connected between the two ends of the operation handle through a pivot axle; the operation handle is pivotally connected with the main body through a fixing axle; a length between the pivot axle and the fixing axle is smaller than a length between the pivot axle and a free end of the operation handle.

5. The motorcycle lifting tool of claim 3, wherein the linkage includes a positioning bore; when the operation handle is shifted to sway against the main body, the linkage drives the support member to slidingly move, such that the positioning bore is in alignment with the first fixing bore, so that the fixing member passes through the positioning bore and the first fixing bore to achieve a positioning function.

6. The motorcycle lifting tool of claim 5, wherein the main body includes an opening through which the operation handle is exposed at an outer side of the main body; the fixing member includes an insertion portion and a ring-pull, and the insertion has an end thereof provided with a positioning ball which is allowed to project from or be pressed into the insertion portion.

7. The motorcycle lifting tool of claim 1, wherein a position limiting plate is disposed at the first end of the main body, with the support member passing through the position limiting plate; a resilient member is disposed between the position limiting plate and the support member, so as to permanently push the support member toward the adjustment support device.

8. The motorcycle lifting tool of claim 1, further comprising a rotation axle and a pin, the rotation axle pivotally connected between the first arm and the second arm, the pin removably passing through the first arm and the second arm; when the pin is removed, the first arm and the second arm are allowed to be pivotally folded against each other with the rotation axle as a pivoting center.

9. The motorcycle lifting tool of claim 1, wherein the holding seat includes a pipe portion, and the pipe portion is internally provided with an inner thread which is screwedly combined with the screw end.

* * * * *